(12) United States Patent
Bauer et al.

(10) Patent No.: US 11,454,277 B2
(45) Date of Patent: Sep. 27, 2022

(54) LINEAR GUIDE DEVICE

(71) Applicant: Festo SE & Co. KG, Esslingen (DE)

(72) Inventors: Thomas Bauer, Deizisau (DE); Markus Meyer zu Brickwedde, Esslingen (DE); Thomas Wagner, Winnenden (DE); Maike Wegenast, Kirchheim unter Teck (DE); Thomas Winkler, Sulzbach (DE)

(73) Assignee: Festo SE & Co. KG, Esslingen (DE)

( * ) Notice: Subject to any disclaimer, the term of this patent is extended or adjusted under 35 U.S.C. 154(b) by 0 days.

(21) Appl. No.: 17/182,912

(22) Filed: Feb. 23, 2021

(65) Prior Publication Data

US 2021/0277941 A1   Sep. 9, 2021

(30) Foreign Application Priority Data

Mar. 6, 2020 (DE) .......................... 102020202872.9

(51) Int. Cl.
*F16C 29/06* (2006.01)
*F16C 29/00* (2006.01)

(52) U.S. Cl.
CPC ........ *F16C 29/0623* (2013.01); *F16C 29/005* (2013.01); *F16C 29/008* (2013.01); *F16C 29/0611* (2013.01)

(58) Field of Classification Search
CPC .. F16C 29/005; F16C 29/008; F16C 29/0602; F16C 29/0604; F16C 29/0607; F16C 29/0609; F16C 29/0611; F16C 29/0614; F16C 29/0623; F16C 29/063; F16C 29/0654; F16C 29/0657
See application file for complete search history.

(56) References Cited

U.S. PATENT DOCUMENTS

| | | | |
|---|---|---|---|
| 4,557,532 A * | 12/1985 | Teramachi | F16C 29/008 384/549 |
| 4,576,422 A | 3/1986 | Laszlo et al. | |
| 7,543,991 B2 * | 6/2009 | Maffeis | F16C 29/0614 384/45 |
| 9,777,768 B2 * | 10/2017 | Mochizuki | F16C 29/0623 |

FOREIGN PATENT DOCUMENTS

| | | |
|---|---|---|
| DE | 102005037323 A1 | 3/2006 |
| DE | 112015005242 T5 | 9/2017 |
| EP | 2847478 A1 | 3/2015 |

* cited by examiner

*Primary Examiner* — James Pilkington
(74) *Attorney, Agent, or Firm* — Hoffmann & Barron, LLP (57) ABSTRACT

A linear guide device includes at least one linear guide unit which has a guide housing, in which two annularly closed circulating channels are formed in each of which a multitude of roller bearing elements is received. The guide housing has a single-piece housing intermediate element which contributes to the formation of the circulating channels and through which passes at least one lubrication channel which communicates with the circulating channels. The lubrication channel passes through the single-piece housing intermediate element and extends partly also in an integral pipe-stub-like lubrication appendix of the single-piece housing intermediate element, wherein the lubrication appendix includes a lubrication opening which is accessible from outside the guide housing for bringing in lubricant.

20 Claims, 4 Drawing Sheets

LINEAR GUIDE DEVICE

BACKGROUND OF THE INVENTION

The invention relates to a linear guide device with at least one linear guide unit which has a guide housing which extends in a housing longitudinal direction and which comprises two housing end sections which are distanced to one another in the housing longitudinal direction, in which guide housing at least two annularly closed circulating channels which are arranged adjacently to one another in a housing height direction which is at right angles to the housing longitudinal direction are formed, in which circulating channels a multitude of roller bearing elements is received, said roller bearing elements being rowed on one another in the channel longitudinal direction and being movable in the channel longitudinal direction whilst executing a circulating movement, wherein each circulating channel comprises two arcuate deflection channel sections which are each arranged in one of the two housing end sections and the guide housing has a single-piece housing intermediate element which comprises two intermediate element deflection sections which are each assigned to one of the two housing end sections and are each arranged between the deflection channel sections of the two circulating channels located in the same housing end section, wherein on each of the sides facing away from one another in the housing height direction an inner wall surface section of one of the two assigned deflection channel sections is formed.

A linear guide device of this type which is known from EP 2 847 478 B1 has several linear guide elements with roller bearing elements which are formed by roller balls and which bear on a guide rail and roll on the guide rail given a linear relative movement which takes place between the linear guide unit and the guide rail. Each linear guide unit comprises a guide housing, in which two circulating channels which are distanced to one another in a housing height direction are formed, in which circulating channels the roller bearing elements are received and in which the roller bearing elements can circulate in the channel longitudinal direction. The guide housing comprises a frame-like housing intermediate element which is inserted between two housing outer elements and together with these two housing outer elements delimits the circulating channels. The housing intermediate element comprises two intermediate element deflection sections which are assigned to one of the two housing end sections, are connected to one another as one piece and at their sides which are away from one another and which each face one of the housing outer elements form an inner wall surface section of an arcuate deflection channel section of one of the two circulating channels. In is particularly on account of the one-piece design of the housing intermediate element that the guide housing can be simply manufactured and assembled for realising both circulating channels.

A linear guide unit which comprises a guide housing, in which a single circulating channel is formed, in which circulating channel a multitude of roller-like roller bearing elements is received is described in U.S. Pat. No. 4,576,422. The guide housing in the middle comprises a single-piece main body, onto which a separate end guide element is applied in the region of housing end sections which are opposite one another and is fastened by way of a screw connection. An arcuate deflection channel section of the circulating channel, into which a lubrication hole which is closed by a plug runs out, is formed in the end guide elements.

A linear ball bearing with a circulating guide and which comprises a central body and two housing shells which consist of synthetic material and encompass a central body is known from DE 10 2005 037 323 A1. Together with the central body, the two housing shells form an circulating channel, in which a multitude of roller balls is received. The two housing shells are fastened to one another by way of screws.

DE 11 2015 005 242 T5 describes a linear guide device with several linear guide units, wherein the linear guide units each comprise a central slider block, onto which two end cover plates are applied at the face side and two circulation caps on the longitudinal side. Together, these components form two circulating channels, in which a multitude of roller balls is received. Lubricant pipe connections for feeding a lubricant to the roller balls is assembled on the outer surfaces of the two end cover plates.

SUMMARY OF THE INVENTION

It is the object of the invention to provide a linear guide device whose at least one linear guide unit permits a simple lubrication of the roller bearing elements given a simple and inexpensive construction.

For achieving this object, according to the invention, with a linear guide device of the initially mentioned type, at least one lubrication channel which communicates with the circulating channels passing through the single-piece housing intermediate element of the guide housing of the linear guide unit and extends partly also in an integral pipe-stub-like lubrication appendix of the single-piece housing intermediate element, said lubrication appendix comprising a lubrication opening which is accessible from outside the guide housing for bringing in lubricant.

The linear guide device according to the invention comprises at least one linear guide unit with two circulating channels which are arranged adjacently to one another in a housing height direction and in which a multitude of roller bearing elements which are preferably designed as roller balls is arranged, said roller bearing elements on use of the linear guide device bearing on a guide rail and being able to roll thereon. The two circulating channels are located on sides of a single-piece housing intermediate element which are away from one another in the housing height direction, said housing intermediate element in the region of the two housing end sections of the guide housing which are opposite one another each comprising a constituent which is denoted as an intermediate element deflection section and which contributes to the formation of two deflection channel sections of the two deflection channels and for this purpose on its sides which are away from one another comprises an inner walls surface section of one of the two assigned deflection channel sections. At least one lubrication channel is formed in the housing intermediate element and this on the one hand is connected in a fluid-leading manner to the circulating channels and on the other hand comprises a lubrication opening which is accessible from the outside and through which a flowable lubricant which is to be fed to the roller bearing elements, in particular a lubricative grease which has a relatively high viscosity, can be fed when required. A good accessibility of the lubrication opening results by way of the lubrication opening being formed on a pipe-stub-like lubrication appendix whose length and shaping can be set on manufacture when required. The pipe-stub-like lubrication appendix is an integral constituent of the single-piece housing intermediate element and can therefore be formed in a direct manner on manufacturing the housing intermediate elements in a particularly inexpensive manner. On account of the single-piece integration of the lubrication appendix into the housing intermediate element, on assembly of the linear guide unit one forgoes a separate assembly procedure which specifically relates to the lubrication appendix. Even if the housing intermediate element on account of the design is surrounded by further components of the guide housing, the pipe-stub-like lubrication appendix permits a placing of the lubrication opening which is defined by it, in a manner in which it is simply accessible from the outside.

In particular, roller balls which are preferably hardened steel balls are applied as roller bearing elements for the at least one linear guide unit. Other designs of roller bearing elements are however likewise possible, for example roller-like and herein in particular roller bearing elements which are designed in a cylindrical or barrel-shaped manner.

Advantageous further developments of the invention are to be derived from the dependent claims.

Preferably, at least one lubrication channel and in particular each present lubrication channel is formed in one of the two intermediate element deflection sections of the housing intermediate element, wherein the assigned pipe-stub-like lubrication appendix is a constituent of the related intermediate deflection section which is integrated as one piece in the intermediate deflection section. In this manner, the lubricant can be comfortably led into the linear guide unit in the region of one of the two housing end sections. This feeding is effected in particular by way of a feed device which is envisaged for this, in particular a grease gun. The feed device can be applied onto the lubrication appendix in the region of the lubrication opening during the lubricant feed-in procedure. The lubrication appendix is expediently provided with a conical deepening in the region of the lubrication opening.

The housing intermediate element with regard to a possible design comprises only a single lubrication channel which communicates with the circulating channels. This single lubrication channel including the assigned lubrication appendix is expediently designed as a constituent of one of the two intermediate deflection sections. It is seen as being particularly advantageous if both intermediate element deflection sections of the single-piece housing intermediate element comprise an integrated pipe-stub-like lubrication appendix and are passed through by a lubrication channel which partly extends in this pipe-stub-like lubrication appendix. This permits a lubrication of the two circulating channels from both axial face sides of the linear guide unit. If for its use, the linear guide unit is installed such that one of its two axial face sides is inaccessible, then at all events one of the two lubrication appendices remains accessible for the feed of lubricant in accordance with requirements.

The single-piece housing intermediate element expediently consists of plastic and in particular is manufactured as an injection moulded part. The at least one lubrication appendix has been manufactured in a direct manner with the original forming of the housing intermediate element.

In each case, an inner wall surface section of a deflection channel section which participates in the formation of a deflection channel is located on the sides of the two intermediate element deflection sections which are orientated in the housing height direction and are away from one another. These inner wall surface sections expediently have a concave cross-sectional contour, so they each form an arcuately curved trough-like deepening in the assigned intermediate element deflection section. With their circulating movement, the roller elements run along in this trough-like deepening in a targeted manner.

The two intermediate element deflection sections of the housing intermediate element are expediently shaped such that they each comprise an arcuate channel wall body which has a convexly curved outer surface and a concavely curved inner surface. The two channel wall bodies are arranged such that their concavely curved inner surfaces face one another. At least one of the arcuate channel wall bodies on its convexly curved outer surface comprises an integrally formed pipe-stub-like lubrication appendix which projects away there, wherein the assigned lubrication channel passes through the arcuate channel wall body as well as the lubrication appendix which is integrally formed thereon.

The lubrication channel expediently runs out with a lubricant exit opening which is opposite its lubrication opening, on the concave inner surface of the arcuate channel wall body for an optimal lubricant transition into the circulating channels.

In the region of the lubricant exit opening, the arcuate channel wall body on its concave inner surface is expediently provided with a lubricant distribution groove which extends in the housing height direction and at its two face sides is open to one of the two adjacent deflection channel sections. This ensures a uniform lubricant distribution out of the lubrication channel into the two circulating channels.

The lubricant exit opening is preferably placed such its distance to the two circulating channels is equally large. This too favours a uniform lubricant delivery into the two circulating channels.

The two intermediate element deflection sections are expediently arranged distanced to one another in the housing longitudinal direction. The single-piece connection which is present between them expediently results from an integral web section of the housing intermediate element which extends in the housing longitudinal direction.

Preferably, the arcuate channel wall body of each intermediate element deflection section comprises two arc ends which are opposite one another. The channel wall bodies are aligned such that their arc ends face one another. Preferably, the arc ends of the two channel wall bodies lie opposite one another at a distance in pairs in the housing longitudinal direction. The web section runs between two opposite lying arc ends of the two channel wall bodies, onto which it is integrally formed as one piece. As a whole, the housing intermediate element thus has a U-shaped fashion, wherein the U-limbs are formed by the two channel wall bodies and the connection section of the U by the web section.

Preferably, each circulating channel, apart from the two deflection channel sections, comprises two linear channel sections which each extend between the two deflection channel sections and which are distanced to one another transversely to the housing longitudinal direction. The two linear channel sections are expediently at least slightly offset to one another in the housing height direction, but can alternatively also lie together in a plane which is at right angles to the housing height direction. Of the two linear channel sections, the one is a working channel section which is open longitudinally and into which a working longitudinal slot which is delimited by the guide housing and is open to the surroundings longitudinally runs out, through which working longitudinal slot the roller bearing elements which are momentarily located in the working channel section project out of the working channel section, in order in particular to bear on an adjacent guide rail. The working channel section is designed such that it can support the roller bearing elements which are located therein, transversely to the channel longitudinal direction when they are impinged on their working sections which project through the working longitudinal slot.

The other linear channel section is expediently purely a return channel section which does not participate in a possible linear guiding and which is peripherally closed expediently in an annular manner.

If the housing intermediate element in the manner which is mentioned further above comprises an integral web section which connects to two intermediate element deflection sections, then in particular this web section is placed such that it extends longitudinally between the two working channel sections and simultaneously delimits both working longitudinal slots at their longitudinal sides which face one another. The working longitudinal slots are dimensioned in their width such that the roller bearing elements cannot pass through and are reliably held back in the working channel section.

A preferred construction of the guide housing, additionally to the housing intermediate element envisages two housing outer elements which are arranged above one another in the housing height direction and between which the housing intermediate element is integrated. One of the circulating channels extends between each housing outer element and the housing intermediate elements. Each circulating channel is therefore formed amid the participation of the housing intermediate element and one of the two housing outer elements.

Each housing outer element expediently comprises two outer element end sections which are distanced to one another in the housing longitudinal direction and are each assigned to one of the two housing end sections of the guide housing. Each intermediate element deflection section of the housing intermediate element is seated between two outer element end sections which belong to different housing outer elements. The outer element end sections on their inner surfaces which face one another in the housing height direction each comprise a receiving deepening, into which the intermediate element deflection section of the housing intermediate element which is arranged therebetween is at least partly embedded, which is to say immerses with a section of its height which is measured in the housing height direction. Each intermediate element deflection section therefore immerses into both outer element end sections which flank it in the housing height direction. In this manner, the linear guide unit can be realised with a very small construction height.

It is seen as being favourable if the receiving deepenings of the outer elements end sections are designed such that the outer element end sections which are assigned to the same housing end section bear on one another with their inner surfaces which face one another, around the assigned intermediate element deflection section. Their receiving deepenings thus together form a receiving space which receives the assigned intermediate element deflection section. In this manner, the housing intermediate element is fixed between the two outer elements end sections without necessitating additional fastening measures. In particular, the guide housing is held together by way of the two outer element end sections being connected to one another, for example materially by way of a welding connection or a bonding connection or also however by latching or by way of a screw connection.

At least that one of the two receiving spaces whose assigned intermediate element deflection section comprises a pipe-stub-like lubrication appendix expediently defines a bore-like receiving section which for a better differentiation is denoted as a pipe stub receiving section and runs out to a face-side outer surface of the guide housing which is orientated in the housing longitudinal direction, and is received in the pipe-stub-like lubrication appendix which is assigned to it. The bore-like pipe stub receiving sections is composed of groove-like deepening sections of the receiving deepenings which are applied onto one another.

The pipe-stub-like lubrication appendix preferably extends up to the face-side outer surface of the guide housing. By way of this, the lubrication opening is optimally accessible for feeding the lubricant irrespectively of the embedding of the intermediate element deflection sections into the two housing outer elements. Expediently, the lubrication appendix in the region of this face-side lubrication opening terminates with the face-side outer surface of the guide housing in a flush manner.

The two housing outer elements are expediently designed identically amongst one another. The linear guide device can be manufactured in a particularly inexpensive manner by way of this use of the same parts.

The linear guide unit expediently comprises an elongate core body which extends in the housing longitudinal direction and is at least partially and preferably only partially framed by the housing intermediate element in a plane which is at right angles to the housing height axis. The core body forms the wall surface sections of the two circulating channels which connect onto the inner wall surface sections of the deflection channel sections. The core body preferably consists of metal and in particular of hardened steel. Inasmuch as the core body forms wall surface sections of the preferably present working channel section, it is optimally suitable for supporting the roller bearing elements which are subjected to external forces, in a low wear manner.

If the linear guide unit comprises two housing outer elements, the core body is expediently arranged between the two housing outer elements in the housing height direction, wherein together with the housing outer elements it delimits linear channel sections of the deflection channels which extend between the arcuate deflection channel sections.

The linear guide device expediently comprises at least one guide rail which preferably has a linear extension and which cooperates with at least one linear guide unit. The linear guide unit always bears with some of its roller bearing elements on the guide rail, so that given a linear travel movement of the linear guide unit, these roller bearing elements roll on the guide rail and simultaneously execute a circulating movement in the channel longitudinal direction within the assigned circulating channel.

In a preferred design of the linear guide device, several linear guide units are fastened with their guide housing to a slide body and interact with at least one guide rail which is arranged a stator body. In particular, the linear guide device can be a constituent of a linear drive.

BRIEF DESCRIPTION OF THE DRAWINGS

The invention is hereinafter explained in more detail by way of the accompany drawing. In these are shown in.

DETAILED DESCRIPTION

Figure 1:
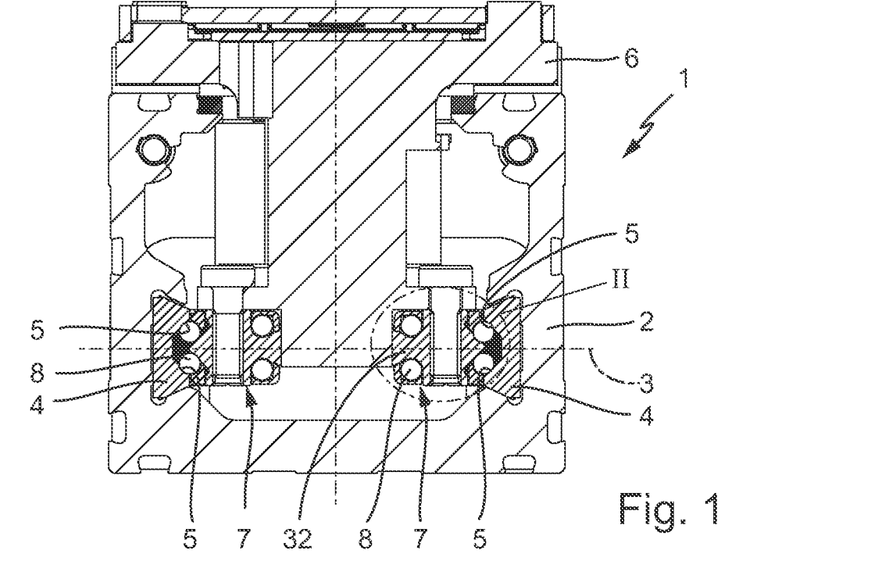
FIG. 1 a longitudinal section of a preferred embodiment of the linear guide device according to the invention in a preferred application with a linear drive, wherein two linear guide units are shown in a cross section, FIG. 2 one of the linear guide units which is evident from FIG. 1 and which is evident in FIG. 1 in the detail II which is framed in a dot-dashed manner, in an isometric individual representation, FIG. 3 the linear guide unit of FIG. 2 in an isometric exploded representation, FIG. 4 the linear guide unit in a longitudinal section according to section line IV-IV of FIGS. 2 and 5, FIG. 5 a cross section of the linear guide unit according to section line V-V of FIG. 4, FIG. 6 a plan view of the linear guide device in the housing height direction with a viewing direction according to arrow VI-VI of FIG. 2, wherein the housing outer element which lies at the top in FIG. 2 is not shown, so that the course of the circulating channel is evident, and FIG. 7 an individual representation of the housing intermediate element which is contained in the linear guide unit and is shown in FIG. 3 in the framed detail VII, in a view with a viewing direction in the housing height direction comparable to FIG. 6.
Figure 2:
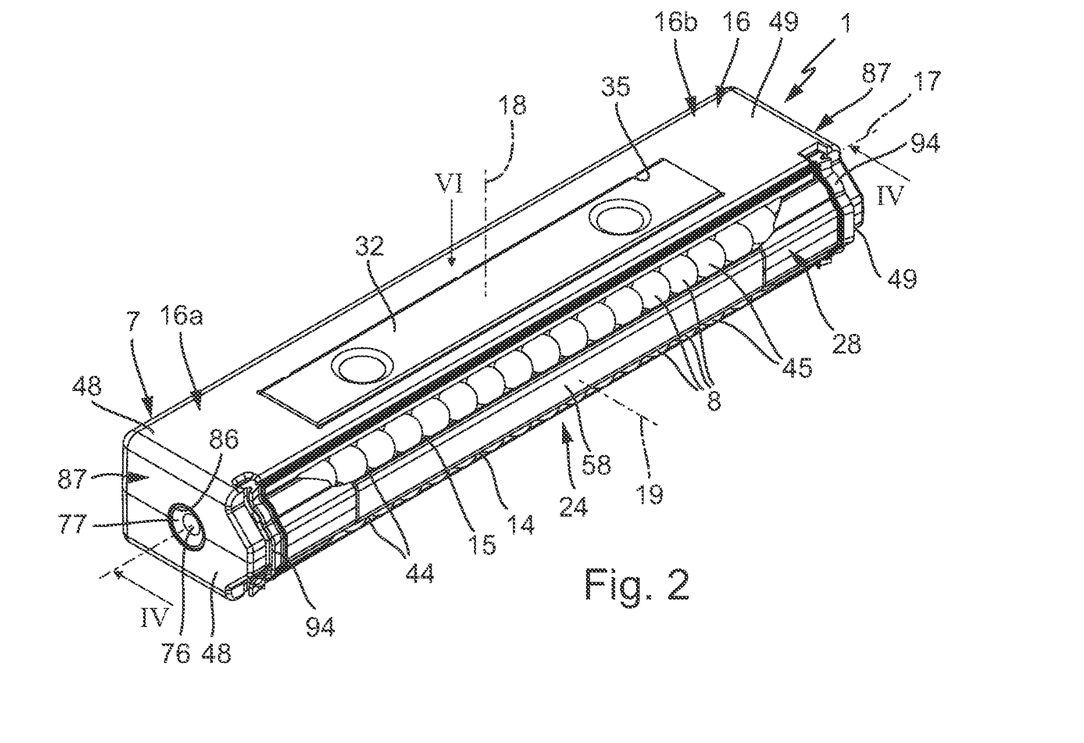

The linear guide device 1 which is illustrated by way of example in FIG. 1 comprises a stator body 2, on which—lying in a common guide plane 3—two guide rails 4 which each have a linear extension are fastened. The guide rails 4 are arranged with longitudinal directions parallel to one another and are distanced to one another transversely to their longitudinal axes, wherein each guide rail 4 on the side which faces the other guide rail 4 comprises two strip-like guide surfaces 5 which are distanced to one another transversely to the guide plane 3.

Figure 5:
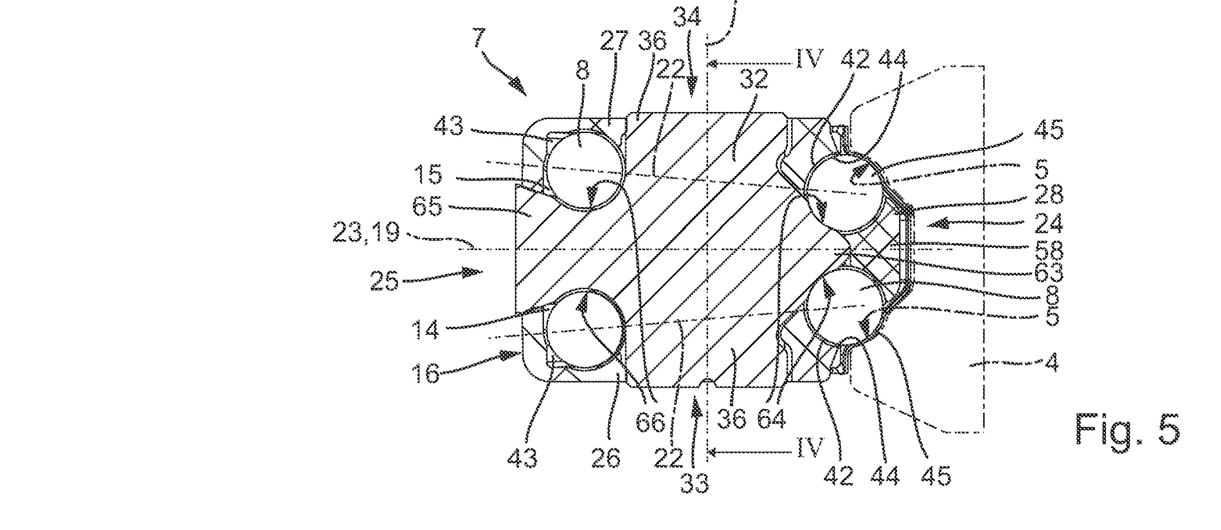
Figure 7:
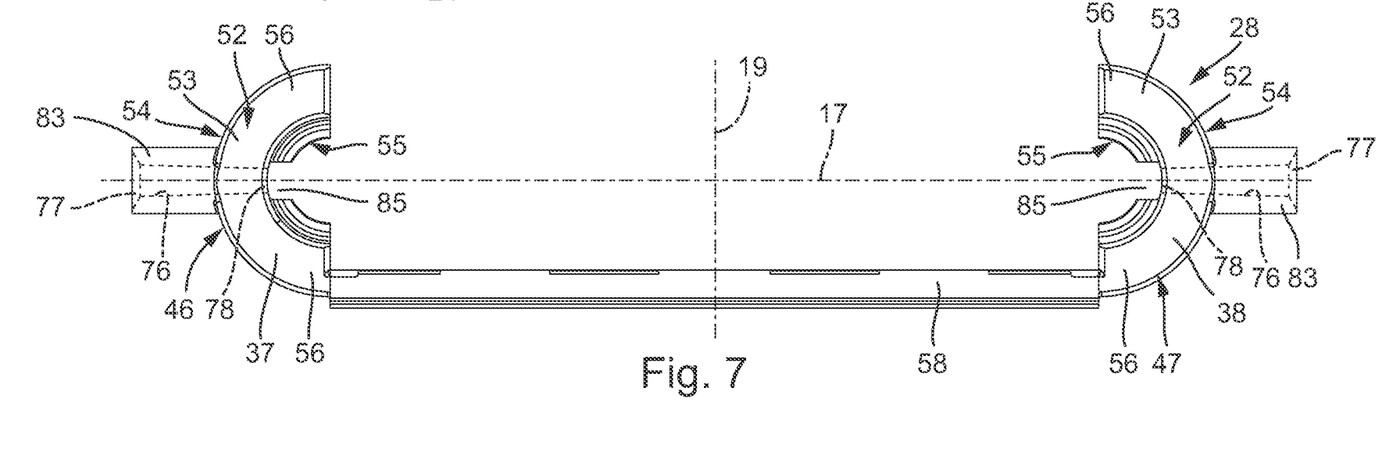

The linear guide device 1 preferably further comprises a slide body 6 which is separate with respect to the stator body 2 and which on an end section which projects between the two guide rails 4 carries two linear guide units 7 which cooperate with one of the guide rails 4. These linear guide rails by way of example are screwed to the slide body 6. The two linear guide units 7 in particular are designed identically, wherein one thereof is illustrated in the position on its own in the Figures to 7. The guide rail 4 which cooperates with a linear guide unit 7 is arranged in a dot-dashed manner in FIG. 5.

Each linear guide unit 7 comprises a plurality of individual roller bearing elements 8 which are preferably roller balls, wherein each linear guide unit 7 is designed in a multi-rowed manner and comprises several roller bearing element rows 12 which are each rowed onto one another whilst forming an annular arrangement. By way of example and preferably each linear guide unit 7 in total holds two such roller bearing element rows 12.

Each linear guide unit 7 always bears with some of the roller bearing elements 8 of a respective roller bearing element row 12 on one of the guide surfaces 5 of the adjacent guide rail 4 which are present in a corresponding number. The slide body 6 is traversable in the longitudinal direction of the guide rails 4, wherein each linear guide unit 7 moves along the adjacent guide rail whilst executing a linear travel movement and the roller bearing elements 8 simultaneously roll on the guide surfaces 5. This rolling of the roller bearing elements 8 is entailed by a circulating movement 11 of the roller bearing elements 8, indicated by a double arrow, in the channel longitudinal direction 13 which is indicated by a dot-dashed line, of a circulating channel 14, 15 of the linear guide unit 7 which receives the roller bearing elements 8 which belong to the same roller bearing element row 12. The number of circulating channels 14, 15 corresponds to the number of the roller bearing elements rows 12, so that the exemplary linear guide units 7 are provided with two circulating channels 14, 15. The roller bearing elements 8 are consecutively rowed on one another in the channel longitudinal direction 13.

The movement direction of the circulating movement 11 depends on the movement direction of the travel movement of the linear guide unit 7.

Concerning the illustrated embodiment example, the linear guide device 1 is a constituent of a linear drive which comprises drive means which are not illustrated further and by way of which the linear movement of the slide body 6 with respect to the stator body 2 can be created. It is the case for example of an electrical or a fluid-actuated linear drive.

The illustrated construction of the linear guide device 1 is only exemplary and only shows one of many possibilities, in order to realise a linear guide device 1 whilst using at least one linear guide unit 7. In the simplest case, the linear guide device 1 merely consists of one or more linear guide units 7.

A preferred construction of the at least one linear guide unit is hereinafter described in more detail.

The linear guide unit 7 comprises a multi-part housing which is denoted as a guide housing 16 and which extends in a linear housing longitudinal direction 17 which is indicated by the dot-dashed line and which is the axis direction of a housing longitudinal axis 17 of the guide housing 16 which is provided with the same reference numeral. The guide housing 16 comprises two housing end sections 16a, 16b which are distanced to one another in the housing longitudinal direction 17.

The guide housing 16 furthermore has a housing height axis 18 which is at right angles to the housing longitudinal direction 17 and whose axis direction defines a housing height direction 18 which is provided with the same reference numeral. Furthermore, the guide housing 16 has a housing transverse direction 19 which is at right angles to the housing longitudinal direction 17 and to the housing height direction 18 and which runs in the axis direction of a housing transverse axis 19 which is provided with the same reference numeral.

The two circulating channels 15 which are designed in an annularly closed manner are arranged in the guide housing 16 adjacently to one another in the housing height direction 18. The channel longitudinal direction 13 of each circulating channel 14, 15 lies in a channel plane 22 which is indicated in a dot-dashed manner in FIG. 5, wherein these two channel planes 22 are expediently each inclined with respect to a housing middle plane 23 which is spanned by the housing longitudinal axis 17 and the housing transverse axis 19, so that their mutual distance in the region of a front side 24 of the linear guide device 7 which faces the housing transverse direction, measured in housing height direction 18, is smaller than in the region of the rear side 25 of the linear guide unit 7 which is opposite with respect to this in the housing transverse direction 8.

According to an embodiment example which is not illustrated, the two channel planes 22 can however also run for example parallel to one another and herein at right angles to the housing height direction 18.

The guide housing 16 expediently comprises two first and second housing outer elements 26, 27 which are arranged above one another in the housing height direction 18 and a housing intermediate element 28 which is inserted between these two housing outer elements 26, 27. These three components expediently consist of plastic and in particular are manufactured by injection moulding.

The linear guide unit 7 expediently additionally comprises an elongate core body 32 which preferably consists of a metal and in particular of hardened steel. It preferably has a constant cross section continuously in its longitudinal direction. The core body 32 is preferably designed in a strand-like manner.

The core body 32 is partially framed by the housing intermediate element 38 in a plane which is at right angles to the housing height axis 18. The housing intermediate element 28 in the housing height direction 18 has a smaller height than the core body 32, so that the latter with respect to the housing height direction 18 at the top and at the bottom projects with a rib-like projection 36 out of the housing intermediate element 28. The core body 32 is also seated between the two housing outer elements 26, 27 which in a shell-like manner engage over the core body 32 in the region of a lower side 33 which is orientated in the housing height direction 18 and of an upper side which is opposite with respect to this. Preferably however, each housing outer element 26, 27 comprises a window-like opening 35, into which the core body 32 positively engages each with one of the two rib-like projections 36 which extend in the housing longitudinal direction 17. In each case, one of these rib-like projections 36 is formed on the core body 32 in the region of the lower side 33 and the upper side 34 of the linear guide unit 7 and extends in the housing longitudinal direction 17 preferably over the complete length of the core body 32.

The two circulating channels 14, 15 are hereinafter also denoted as a first circulating channel 14 and a second circulating channel 15 for an improved differentiation. The first circulating channel 14 extends between the first housing outer element 26 and the housing intermediate element 28, whereas the second circulating channel 15 extends between the second housing outer element 27 and again the housing intermediate element 28. Both circulating channels 14, 15 extend in a frame-like manner around the core body 32. Said more precisely, the first circulating channel 14 extends around the rib-like projection 36 which is located on the lower side 33 and the second circulating cannel 15 extends around the rib-like projection 36 which is located in the upper side 34.

Each circulating channel 14, 15 is commonly delimited by the two housing outer elements 26, 27, the housing intermediate element 28 and the core body 32. The wall surface of each circulating channel 14, 15 is composed of wall surface sections which are formed on the aforementioned components.

Each circulating channel 14, 15 has two arcuate channel sections 37 which each arranged in one of the two housing end sections 16a, 16b of the guide housing 16 and in which the roller bearing elements 8 with their circulating movement 11 are deflected whilst undergoing a direction change and which are therefore denoted as deflection channel sections 37, 38 for an improved differentiation. Each deflection channel section 37, 38 preferably has a course which is circular arc shaped with an angular extension over the length of 180 degrees. The two end sections 39 of each deflection channel section 37, 38 preferably lie in a plane which is at right angles to the housing longitudinal axis 17 and face the respective other deflection channel section 37, 38 in the housing longitudinal direction 17.

Each circulating channel 14, 15 further comprises two linear channel sections 42, 43, these being a front linear channel section 41 which lies on the front side 24 and a rear linear channel section 43 which lies in the region of the rear side 25. Each linear channel section 42, 43 extends between one of the two end sections 39 of the two deflection channel sections 37, 38. An elongate annular shape of the circulating channel 14, 15 is defined by way of this.

Whereas the two deflection channel sections 27 and the rear linear channel section 43 which can also be denoted as a return channel section 43 are peripherally completely closed, each front linear channel section 42 which is hereinafter denoted as a working channel section 42 for an improved differentiation comprises a slot-like opening 4 in the region of the front side 24. This slot-like opening 44 which is hereinafter also denoted as a working longitudinal slot 44 is delimited by the guide housing 16 and connects the assigned working channel section 42 to the direct environment of the linear guide unit 7. The width of each working longitudinal slot 44 which is measured transversely to the longitudinal direction 17 is smaller than the maximum diameter of each roller bearing element 18, so that the roller bearing elements 8 which are momentarily located in the working channel section 42 are held back by the slot edges in the working channel section 42, but nevertheless partially with a peripheral section which is denoted as the working section 45 can project out of the guide housing 16, in order to be capable of bearing on an assigned guide surface 5 of a guide rail 4 in a rolling manner in the state of use of the linear guide unit 7.

The housing intermediate element 28 is designed as one piece and comprises two sections which are distanced to one another in the housing longitudinal direction 17 and which contribute to the formation of the deflection channel sections 37, 38 and are therefore denoted as a first and second intermediate element deflection section 46, 47. Each intermediate element deflection section 46, 47 is assigned to one of the two housing end sections 16a, 16b.

Each housing outer element 26, 27 comprises two end sections which are opposite one another in the housing longitudinal direction 17 and for an improved differentiation are denoted as a first and second outer element end section 48, 49. Each outer element end section 48, 49 is assigned to one of the two housing end sections 16a 16b which are hereinafter also denoted as a first and second housing end section 16a, 16b. The first intermediate element deflection section 46 is seated between the two first outer element end sections 48, whereas the second intermediate element deflection section 47 is seated between the two outer element end sections 49. The two outer element end sections 48, 49 each delimit the window-like opening 35 at the face side.

The deflection channel sections 37 which are assigned to the first housing end section 16a are hereinafter also denoted as a first deflection channel sections 37, whereas the deflection channel sections 38 which are assigned to the second housing end section 16b are hereinafter also denoted as second deflection channel sections 38.

The first intermediate element deflection section 46 together with each of the first outer element end sections 48 defines one of the two first deflection channel sections 37. The second intermediate element deflection section 47 together with each second outer element end section 49 defines one of the second deflection channel sections 38. For this, an inner wall surface section 52 of the assigned deflection channel section 37, 38 which has an arcuate and in particular a circularly arcuate longitudinal extension is formed on each intermediate element deflection section 46, 47 on its two sides which are away from one another in the housing height direction and which each face one of the outer element end sections 48, 49. The curvature of the inner wall surface section 52 corresponds to the desired curvature of the assigned deflection channel section 37, 38.

Each intermediate element deflection section 46, 47 preferably has a section which as a whole is structured in a circular-arc-shaped manner and on which the two assigned inner wall surface sections 52 are formed and which is hereinafter denoted as an arcuate channel wall body 53. Each of these arcuate channel wall bodies 53 comprises a convexly curved outer surface 54 and a concavely curved inner surface 55 which is opposite with respect to this. The two arcuate channel wall bodies 53 are aligned such that their concave inner surfaces 55 face one another in the housing longitudinal direction 17, which accordingly also applies to the end sections of the arcuate channel wall bodies 53 which are denoted as arc ends 56. Each of these arc ends 56 defines one of the end sections 39 of the deflection channel sections 37, 38.

Figure 3:
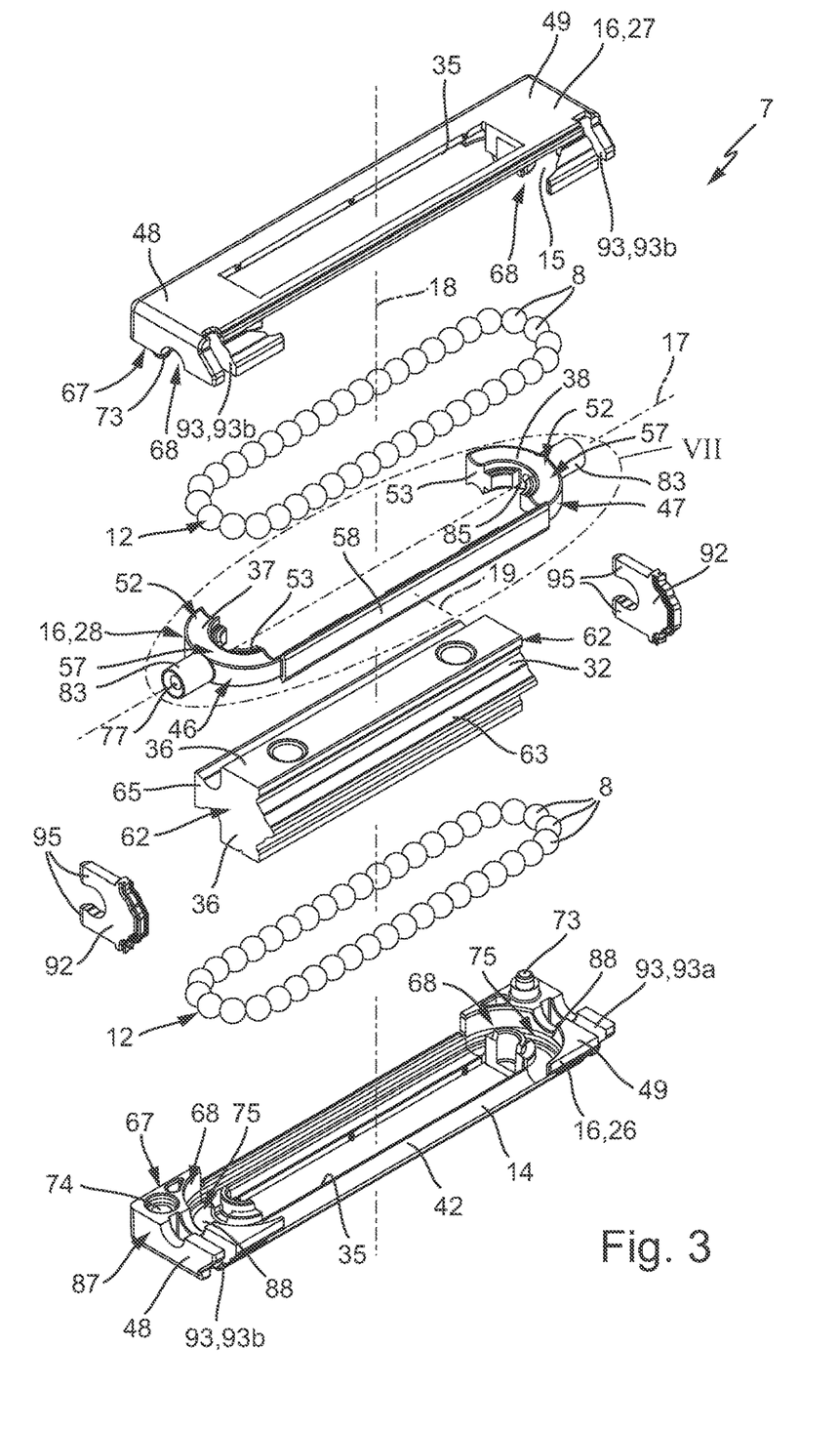
Figure 4:
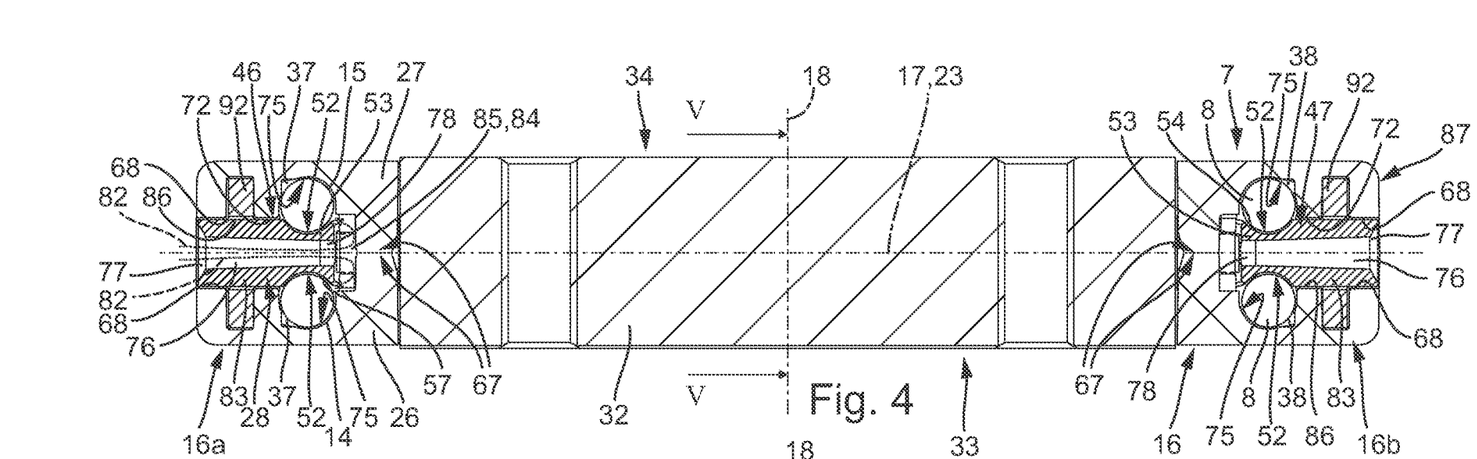

As can be derived particularly well in particular in FIGS. 3 and 4, the inner channel wall sections 52 of the two deflection channel sections 37, 38 which are formed on the channel wall bodies 53 expediently have a concave cross sectional contour, so that an arcuately curved trough-like deepening 57 results, in which deepening the preferably spherical roller bearing elements 8 are well supported given their circulating movement 11.

The two arcuate channel wall bodies 53 are expediently fixedly connected to one another by way of an integral web section 58 of the single-piece housing intermediate element 28 which extends in the housing longitudinal direction 17. The web section 58 extends between two arc ends 56 of the two channel wall bodies 53 which lie opposite one another in the housing longitudinal direction 17. Both channel wall bodies 53 therefore project from the web section 58 with the same orientation in the housing transverse direction 19. By way of this, as a whole a U-shaped design is given to the housing intermediate element 28 which is particularly expressed in FIGS. 3 and 7.

Disregarding the web section 58, no connection is present between the two arcuate channel wall bodies 53. The web section 58 extends exclusively between the two arc ends 56 which face the front side 24, whereas the arc ends 56 which face the rear side 25 end freely.

The housing intermediate element 28 is applied onto the core body 32 in manner such that the two intermediate element deflection sections 46, 47 each connect onto one of the two axial end-faces 62 of the core body 32 which are opposite one another, and the web section 58 extends longitudinally past the core body 32 in the region of the front side 24. Herein, the web section 58 is seated on a front support rib 63 of the core body 32 which extends in the housing longitudinal direction 17 and on which further wall surface sections 64 of the two circulating channels 14, 15 are formed, said further wall surface sections connecting onto the inner wall surface sections 52 of the two intermediate element deflection sections 46, 47. These further wall surface sections 64 together with the two housing outer elements 26, 27 and the web section 58 contribute to the formation of the working channel section 42.

The web section 58 furthermore simultaneously delimits both working longitudinal slots 44 at their longitudinal sides which face one another.

In the region of the rear side 25, the core body 32 expediently comprises a further, rear support rib 65 which as the front support rib 63 extends between the two axial end-faces 62 and on whose sides which are opposite one another in the housing height direction a further wall surface section 66 of the two circulating channels 14, 15 is formed, said further wall surface section together with the respective one of the two housing outer elements 26, 27 delimiting one of the two return channel sections 43.

The two housing outer elements 26, 27 at the inner surfaces 67 of their outer element end sections 48, 49 which face one another each comprise a receiving deepening 68. Each receiving deepening 68 is open to the assigned inner surface 67. The inner contour of the receiving deepenings 68 is adapted the outer contour of the intermediate element deflection sections 46, 47 such that each intermediate element deflection section 46, 47 partially immerses into the two receiving deepenings 68 in the housing height direction 18, said receiving deepenings flanking the respective intermediate element deflection section 46, 47.

Preferably, the receiving deepenings 68 are designed such that the two housing outer elements 46, 47 with their inner surfaces 67 which face one another abut each other around the receiving deepenings 68. In this manner, the pairs of receiving deepenings 68 which are assigned to one another each form a receiving space 72, in which the assigned intermediate element deflection section 46 is received in preferably complete manner.

Expediently, the two housing outer elements 26, 27 on their inner surfaces 67 which face one another each comprise at least one fastening projection 73 which extends in the housing height direction and at least one fastening deepening 74 which is complementary to this, wherein at least one fastening projection 73 of each housing outer element 26, 27 and at least one fastening deepening 74 of each housing outer element 26, 27 lie opposite one another in pairs, so that in the state of the two housing outer elements 26, 27 in which they are applied onto one another in the housing height direction 18, they engage into one another amid a mutual latching. By way of this, the housing intermediate element 28 and the core body 2 are simultaneously also fixed.

Preferably, each housing outer element 26, 27 comprises precisely one fastening projection 73 and precisely one fastening deepening 74 which is distanced to this in the housing longitudinal direction 17, so that in the assembled state two pairs of fastening projections 73 and fastening recesses 74 which engage into one another are present. It is particularly in this context that the two housing outer elements 26, 27 are designed identically amongst one another.

Instead of a mechanical latching connection, other fastening measures, for example a welding connection or a bonding connection or a screw connection can also be provided for the mutual fixation of the two housing outer elements 26, 27.

In the region of the arcuate channel wall bodies 53, the inner surface of the receiving deepenings 68 forms the outer wall surface sections 75 of the deflection channel sections 37, 38 which lie oppose the inner wall surface sections 52. These outer wall surface sections 75 have the same arcuate curvature as the inner wall surface sections 52 which lie opposite them in the housing height direction 18.

At least one lubrication channel 76 passes through the housing intermediate element 28 which is designed as one piece and preferably of plastic, through which lubrication channel a flowable lubricant can be led back into the two circulating channels 14, 15 from the outside, in order to effect a lubrication of the roller bearing elements 8 which ensures an easy-going circulating movement with a reduced wear.

Only a single or also several lubrication channels 76 which are arranged in a distributed manner can be formed in the housing intermediate elements 28. It is advantageous if each present lubrication channel 76 is formed in one of the two intermediate element deflection sections 46, 47 of the housing intermediate element 28. In accordance with the realised embodiment example, a lubrication channel 76 is preferably located in each of the two intermediate element deflection sections 46, 47. Each of these two lubrication channels 76 can be used for bringing in lubricant.

Figure 6:
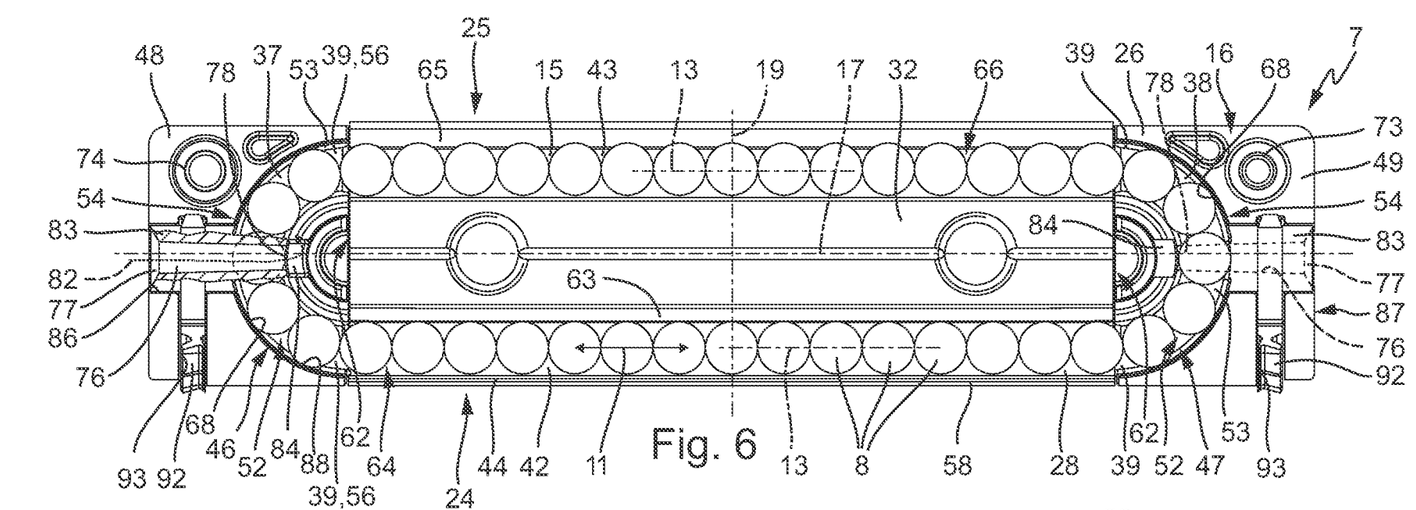

Each lubrication channel 76 on an outer end comprises a lubrication opening 77 which is suitable for feeding in a flowable lubricant. Furthermore, each lubrication channel 76 at its inner end comprises a lubricant exit opening 78 which is flow-connected to all present circulating channels 14, 15 of the linear guide unit 7. A lubricant which is fed in at the lubrication opening 77 can flow through the lubrication channel 76, exit at the lubricant exit opening 78 and subsequently flow into the two circulating channels 14, 15 which are connected thereto. The associated flow course of the lubricant is indicated by arrows at 82 in the FIGS. 4 and 6.

Each lubrication channel 76 extends with a part length in a lubrication appendix 83 of the housing intermediate element 28 which is designed in an pipe-stub-like manner, thus in the manner of a pipe stub. In particular the lubrication appendix 83 is a protrusion of the housing intermediate element 28. If, as is according to the illustrated embodiment example, the lubrication channels 76 passes through an intermediate element deflection section 46, 47, the assigned lubrication appendix 83 is an integral constituent of the respective intermediate element deflection section 46, 47. Accordingly, with regard to the illustrated embodiment example, each of the two intermediate element deflection sections 46, 37 comprises a pipe-stub-like lubrication appendix 83 which is integrated as one piece. Each lubrication appendix 83 comprises a lubrication opening 77 and is arranged such that the lubrication opening 77 is freely accessible from outside the guide housing 16 for feeding in the lubricant.

In the operationally ready state of the linear guide unit 7, the two circulating channels 14, 15 are filled with lubricant which has been pressed in through the lubrication appendices 83. The lubricant for example is a mineral or synthetic lubrication grease which has a relatively large viscosity, so that it even remains in the circulating channels 14, 15 when the lubrication channels 76 are constantly open—which is the case with the illustrated embodiment example.

According to an embodiment example which is not illustrated, each lubrication appendix 83 can comprise a closure member which is biased into a closure position in a spring-loaded manner and which similarly to a check valve has a check function and only permits the passage of lubricant in the direction of the circulating channels 14, 15 whilst it blocks it in the opposite direction. For example, each lubrication appendix 83 can be designed itself in the manner of a grease nipple or be provided with a grease nipple at its lubrication opening 77.

Preferably, the lubrication channel 76 as a whole has a linear extension. It is further advantageous if the lubrication channel 76 coming from the lubrication opening 77 conically tapers towards the lubricant exit opening 78.

Each lubrication appendix 83 has a longitudinal extension and is preferably arranged and aligned such that it extends in the housing longitudinal direction 17. Its longitudinal axis preferably runs coaxially to the housing longitudinal axis 17 which runs in the middle of the housing.

If the intermediate element deflection section 46, 47 which comprises a lubrication appendix 83 has an arcuate channel wall body 53, then it is advantageous if the lubrication appendix 83 is integrally formed on its convexly curved outer surface 54. This is realised with the illustrated embodiment example. The lubrication appendix 83 in particular is seated in a region of the convex outer surface 54 which is at the middle with respect to the two arc ends 83. There, it projects away from the channel wall body 53 in the housing longitudinal direction 17, in particular in a direction which is radial with respect to the centre of curvature of the arcuate channel wall body 53. By way of example, the two lubrication appendices 83 thus project away from the housing intermediate element 28 in axially opposite directions.

Each lubrication channel 76 passes through the lubrication appendix 83 as well as the arcuate channel wall body 53 which connects thereto. An outer channel section of the lubrication channel 76 which connects onto the lubrication opening 77 runs in the lubrication appendix 83, whereas an inner channel section of the lubrication channels 76 which connects thereto passes through the channel wall body 53 and runs out at the concavely curved inner surface 55 of the channel wall body 53 with the lubricant exit opening 78.

In the inside of the guide housing 84, a free space 84 connects onto the lubricant exit opening 78, and this free space extends in the housing height direction 18 to into the region of both circulating channels 14, 15 and specifically to into the region of the two deflection channel sections 37, 38. The free space 84 hence creates a flow connection between the lubrication channel 76 and the two assigned deflection channel sections 37, 38. The lubricant which is pressed into the lubrication appendix 83 can enter through this free space 84 into the two deflection channels sections 37, 38, from where it is distributed by the roller bearing elements 8 which execute the circulating movements, in the complete circulating channel 14, 15.

By way of example, the free space 84 is formed by a lubricant distribution groove 85 which extends in the housing height direction 18 and which is formed in the arcuate channel wall body 53 in the region of the lubricant exit opening 78. The lubricant distribution groove 85 runs out at its face sides which face the housing height direction 18, at the height of the inner wall surface sections 52 of the channel wall body 53.

By way of example, the lubricant distribution groove 85 together with the inner surface of the receiving deepenings 68 which encompasses the intermediate element deflection section 46, 47 forms a lubricant distribution channel. The embedding of the arcuate channel wall body 53 into the two receiving deepenings 68 ensures that the lubricant is led through the lubricant distribution groove 85 in a targeted manner into the deflection channel sections 37, 38 and cannot escape anywhere else as a leakage from the linear guide unit 7.

The receiving space 72 which is formed by the two receiving deepenings 68 which lie opposite one another in the housing height direction 18 expediently has a bore-like section which is to be denoted as a pipe-stub receiving section 86 and which coming from an arcuate receiving space section 88 which receives the channel wall body 53 extends up to a face-side outer surface 87 of the guide housing 16 which is orientated in the housing longitudinal direction 17. By way of example, for this reason one of the two pipe stub receiving sections 86 runs out to each of the two face-side outer surfaces 87 of the guide housing 16 which are opposite one another in the housing longitudinal direction 17. Each face-side outer surface 87 by way of example is composed of surface sections of the two housing outer elements 26, 27.

Each pipe-stub-like lubrication appendix 83 extends in one of the pipe stub receiving sections 86, wherein the length of the lubrication appendix 83 in particular is selected such that the lubrication opening 77 which is formed on it is placed in the region of the assigned face-side outer surface 87. It is particularly advantageous if the lubrication opening 77 is flush with the assigned face-side outer surface 87, which is the case with the illustrated embodiment example.

In the region of the lubrication opening 77, the lubrication channel 76 expediently has a conical centring contour which favours the sealed attachment of a lubricant feed device.

In order to avoid a contamination of the roller bearing elements 8 in the region of the working longitudinal slots 44 on operation of the linear guide unit 7, it is advantageous if a flexible wiper element 92 which can bear on the assigned guide rail 4 in a slidingly movable manner is arranged on the guide housing 16 in the region of the front side 24 axially on both sides of the working longitudinal slots 44. This is the case with the illustrated embodiment example.

Preferably, the wiper elements 92 consist of a rubber elastic material. By way of example, each wiper element 92 is designed in a plate-like manner and is inserted into a slot-like narrow holding grove 93 of the guide housing 16 which is open to the front side 24. The holding groove 93 just as the plate-like wiper element 92 extends in a plane which is at right angles to the housing longitudinal direction. In the region of the front side 24, each wiper element 92 projects with a wiping section 94 beyond the guide housing 16, wherein it bears with this wiping section 94 on the adjacent guide rail 4 and there in particular bears on the guide surfaces 5 in a slidingly displaceable manner.

The wiping element 92 is non-positively fixed in the holding groove 93 expediently by way of clamping.

Each holding groove 93 is composed of two upper and lower groove sections 93a, 93b which are adjacent one another in the housing height direction 18 and which are each formed in one of the two outer elements end sections 48, 49.

Preferably, each holding groove 93 in the housing longitudinal direction 17 lies at the same height with one of the lubrication appendices 83. The holding groove 93 runs out laterally into the pipe stub receiving sections 86 of the assigned receiving pace 72. Each wiper element 92 is preferably designed in a U-shaped manner and comprises two limb sections 95 which are distanced to one another in the housing height direction 18 and are orientated in the housing transverse direction 19 and with which said wiper element engages over the assigned lubrication appendix 83 at the top and bottom. Each wiper elements 92 is therefore stuck onto the adjacent lubrication appendix 83 in a straddling manner.

The intermediate space of the wiper element 92 which is present between the two limb sections 95 preferably has an undercut cross-sectional contour which results in the wiper element 92 being positively snapped onto the lubrication appendix 83, by which means a particularly reliable fixation of the wiper elements 92 on the guide housing 16 is ensured.

Each wiper elements 92 preferably also contributes to preventing penetration of contamination out of the pipe stub receiving section 86 into the arcuate receiving space section 88 and into the deflection channel sections 37, 38 which are located there.

What is claimed is:

1. A linear guide device with at least one linear guide unit which has a guide housing which extends in a housing longitudinal direction, the guide housing comprising:
    two housing end sections which are distanced to one another in the housing longitudinal direction;
    at least two annularly closed circulating channels formed in the guide housing, the circulating channels being arranged adjacently to one another in a housing height direction which is at a right angle to the housing longitudinal direction;
    a multitude of roller bearing elements received in each of the circulating channels, said roller bearing elements being arranged in rows in the channel longitudinal direction and being movable in the channel longitudinal direction whilst executing a circulating movement; and
    a single-piece housing intermediate element, the housing intermediate element having a top side and a bottom side facing away from each other in the height direction, the housing intermediate element further including two intermediate element deflection sections and at least one integral lubrication pipe appendix having a lubrication opening which is accessible from outside the guide housing for bringing in lubricant,
    wherein each circulating channel comprises two arcuate deflection channel sections which are each arranged in one of the two housing end sections, and
    wherein each intermediate element deflection section of the housing intermediate element is arranged between the deflection channel sections of the two circulating channels located in the same housing end section, and
    wherein an inner wall surface section of one of the two respective deflection channel sections is formed on each of the top side and the bottom side of the housing intermediate section, and
    wherein at least one lubrication channel which communicates with the circulating channels passes through the housing intermediate element and extends partly in the lubrication pipe appendix of the housing intermediate element.

2. The linear guide device according to claim 1, wherein said at least one lubrication channel is formed in one of the intermediate element deflection sections of the housing intermediate element, wherein the lubrication pipe appendix is integrated as one piece with the intermediate deflection section.

3. The linear guide device according to claim 2, wherein both intermediate element deflection sections of the housing intermediate element comprise an integrated lubrication pipe appendix and a lubrication channel which partly extends in the lubrication pipe appendix.

4. The linear guide device according to claim 1, wherein the housing intermediate element consists of plastic.

5. The linear guide device according to claim 1, wherein the inner wall surface sections of the deflection channel sections which are formed on the intermediate element deflection sections have a concave cross sectional contour.

6. The linear guide device according to claim 1, wherein the two intermediate element deflection sections of the housing intermediate element each comprise an arcuate channel wall body which defines the inner wall surface sections of the respective deflection channel section, wherein the lubrication pipe appendix is integrally formed as one piece on a convexly curved outer surface of at least one of the two arcuate channel wall bodies in a manner projecting away in the housing longitudinal direction, wherein the lubrication channel passes through the arcuate channel wall body as well as through the lubrication pipe appendix which is formed thereon.

7. The linear guide device according to claim 6, wherein the lubrication channel opens out with a lubricant exit opening, which is opposite to the lubrication opening, on a concave inner surface of the arcuate channel wall body which faces away from the lubrication pipe appendix.

8. The linear guide device according to claim 7, wherein, in a region of the lubricant exit opening, the arcuate channel wall body on its concave inner surface comprises a lubricant distribution groove which extends in the housing height direction and which is open to the two deflection channel sections.

9. The linear guide device according to claim 1, wherein the two intermediate element deflection sections of the housing intermediate element are connected to one another by an integral web section of the housing intermediate element which extends in the housing longitudinal direction.

10. The linear guide device according to claim 9, wherein the two intermediate element deflection sections of the housing intermediate element each comprise an arcuate channel wall body which defines the inner wall surface sections of the respective deflection channel section, wherein the lubrication pipe appendix is integrally formed as one piece on a convexly curved outer surface of at least one of the two arcuate channel wall bodies in a manner projecting away in the housing longitudinal direction, wherein the lubrication channel passes through the arcuate channel wall body as well as through the lubrication pipe appendix which is formed thereon, and wherein the arcuate channel wall body of each intermediate element deflection section comprises two arc ends which are opposite one another, wherein the two arcuate channel wall bodies with their arc ends face one another and the web section extends between two arc ends of the two arcuate channel wall bodies, so that as a whole the housing intermediate element is designed in a U-shaped manner.

11. The linear guide device according to claim 1, wherein each circulating channel comprises two linear channel sections which each extend between the two deflection channel sections and are arranged distanced to one another transversely to the housing longitudinal direction and of which one is a working channel section, into which a working longitudinal slot which is delimited by the guide housing and is open to the surroundings so that the roller bearing elements which are momentarily located in the working channel section project out of the working channel section.

12. The linear guide device according to claim 11, wherein the two intermediate element deflection sections of the housing intermediate element are connected to one another by an integral web section of the housing intermediate element which extends in the housing longitudinal direction and wherein the integral web section of the housing intermediate element extends between the two working channel sections in the housing longitudinal direction and simultaneously delimits both working longitudinal slots at their longitudinal sides which face one another.

13. The linear guide device according to claim 1, wherein the guide housing comprises two housing outer elements which are arranged one above the other in the housing height direction, wherein the housing intermediate element is inserted between the two housing outer elements and wherein between each housing outer element and the housing intermediate element extends one of the circulating channels.

14. The linear guide device according to claim 13, wherein each housing outer element comprises two outer element end sections which are each assigned to one of the two housing end sections, wherein each intermediate element deflection section of the housing intermediate element is arranged between two outer element end sections in the housing height direction, wherein the outer element end sections on their inner surfaces which face one another in the housing height direction each comprise a receiving deepening, into which the intermediate element deflection section which is arranged therebetween is at least partly embedded.

15. The linear guide device according to claim 14, wherein the outer element end sections which are assigned to the same housing end section abut each other with their inner surfaces which face one another, so that their receiving deepenings together form a receiving space which receives the assigned intermediate element deflection section.

16. The linear guide device according to claim 15, wherein at least one of the two receiving spaces comprises a pipe stub receiving section which opens out to a face-side outer surface of the guide housing, said face-side outer surface being orientated in the housing longitudinal direction, and in which pipe stub receiving section the lubrication pipe appendix of the intermediate element deflection section is received.

17. The linear guide device according to claim 13, wherein the two housing outer elements are identical.

18. The linear guide device according to claim 1, wherein the linear guide unit comprises an elongated core body which extends in the housing longitudinal direction, is at least partially framed by the housing intermediate element in a plane at a right angle to the housing height direction and forms further wall surface sections of the two circulating channels connecting with the inner wall surface sections of the deflection channel sections.

19. The linear guide device according to claim 18, wherein the guide housing comprises two housing outer elements which are arranged one above the other in the housing height direction, wherein the housing intermediate element is inserted between the two housing outer elements, wherein between each housing outer element and the housing intermediate element extends one of the circulating channels and wherein the core body is arranged between the two housing outer elements in the housing height direction and together with the housing outer elements delimits linear channel sections of the deflection channels which extend between the deflection channel sections.

20. The linear guide device according to claim 1, further comprising at least one guide rail, with respect to which the linear guide unit is linearly displaceable and on which the linear guide unit always bears with some of its roller bearing elements, so that given a linear travel movement of the linear guide unit, the roller bearing elements roll on the guide rail and simultaneously execute a circulating movement in the channel longitudinal direction within the assigned circulating channel.

* * * * *